United States Patent [19]

Arzoumanidis et al.

[11] 4,374,816

[45] * Feb. 22, 1983

[54] PROCESS FOR PRODUCING HYPO-PHOSPHOROUS ACID ($H_3PO_2$) AND NON-TRANSITION METAL HYPOPHOSPHITES

[75] Inventors: Gregory G. Arzoumanidis, Stamford, Conn.; Kirk V. Darragh, Yorktown, N.Y.

[73] Assignee: Stauffer Chemical Company, Westport, Conn.

[*] Notice: The portion of the term of this patent subsequent to May 5, 1998, has been disclaimed.

[21] Appl. No.: 207,306

[22] Filed: Nov. 17, 1980

Related U.S. Application Data

[63] Continuation of Ser. No. 35,576, May 3, 1979, Pat. No. 4,265,866.

[51] Int. Cl.$^3$ .................. C01B 25/12; C01B 25/16; C01B 15/16
[52] U.S. Cl. ...................................... 423/304; 423/307
[58] Field of Search ................ 423/304, 307, 316, 317

[56] References Cited

U.S. PATENT DOCUMENTS 2,977,192  3/1961  Cummins ............................ 423/307
3,052,519  9/1962  Bianchi et al. ...................... 423/307

FOREIGN PATENT DOCUMENTS 1215739  12/1970  United Kingdom ................ 423/307
447359   12/1974  U.S.S.R. ............................... 423/304

OTHER PUBLICATIONS

Chemical Abstracts, vol. 76, 1972, 50585j.
Paris & Tardy, Compt. Rendu 223, 1946, 242-243.

*Primary Examiner*—O. R. Vertiz
*Assistant Examiner*—Gregory A. Heller

[57] ABSTRACT

A process for producing hypophosphorous acid ($H_3PO_2$) by reacting, in the absence of a catalyst and under an acidic condition, phosphine with an aqueous solution of hydrogen peroxide to produce an acid solution. The acid solution is then contacted with an non-transition metal hydroxide, oxide or carbonate, e.g. sodium hydroxide, to produce a product composition containing a hypophosphite, e.g. sodium hypophosphite ($NaH_2PO_2.H_2O$). The process of this invention finds particular utility in processes of the type wherein phosphorus is reacted with an aqueous non-transition metal hydroxide composition, e.g. an aqueous suspension of a sodium hydroxide and calcium hydroxide, to produce a hypophosphite and byproduct phosphine. The process of this invention converts a substantial portion of the byproduct phosphine to hypophosphite.

28 Claims, No Drawings

PROCESS FOR PRODUCING HYPO-PHOSPHOROUS ACID ($H_3PO_2$) AND NON-TRANSITION METAL HYPOPHOSPHITES

This is a continuation of application Ser. No. 35,576, filed May 3, 1979, now U.S. Pat. No. 4,265,866.

BACKGROUND OF THE INVENTION

1. Field of the Invention

This invention relates to a process for producing hypophosphorous acid ($H_3PO_2$) and non-transition metal hypophosphites therefrom, and particularly relates to converting byproduct phosphine produced from certain processes, to hypophosphorous acid ($H_3PO_2$) and hypophosphites therefrom.

Alkali metal hypophosphites, and in particular, sodium hypophosphite ($NaH_2PO_2.H_2O$) have been used for many years in medicine. Originally, hypophosphites, were combined with cod liver oil and other ingredients (Scotts emulsion) and made into various syrups. A relatively recent application of hypophosphites is in the chemical reduction of nickel salts to form smooth, adherent platings. This commercial plating process, which is superficially similar to the silvering of mirrors, has been called "electroless nickel plating" (ENP). Such plating is used for protecting the interiors of large vessels, such as tank cars and provides better wear and corrosion resistance than other similar type coatings, e.g. chrome plating. Chrome plating processes are now particularly disfavored, due to the environmental concerns related to the toxicity of effluents from such processes which contain chromium. Other electroless nickel plating applications are in printing rolls, baking pans and processes for the recovery of oil.

In commercial processes for producing hypophosphites, for example, sodium hypophosphite ($NaH_2PO_2.H_2O$), phosphorus, and in particular, yellow phosphorus ($P_4$), is reacted with an aqueous metal hydroxide composition, typically an aqueous suspension of sodium hydroxide and calcium hydroxide, to produce the hypophosphite. Typically, about 50% of the phosphorus is converted to the hypophosphite, about 25% is converted to phosphite, which is precipitated, for example, as a calcium salt, and the remaining 25% is converted to phosphine ($PH_3$), (see, for example, Auslegeschrift No. 1,112,054 to Knapsack-Griesheim A.G.). Generally, the phosphine is oxidized to $P_2O_5$ and $H_2O$ by burning. This then forms phosphoric acid. This procedure for disposing of phosphine is economically wasteful and can cause pollution problems if appropriate pollution control equipment is not utilized.

There have been attempts to convert phosphine to hypophosphites ($H_2PO_2^-$), for example, by reacting phosphine with sodium hypochlorite in an alkaline solution. This process is unsatisfactory because it produces byproduct sodium chloride which is difficult to remove from the product stream (see, for example, Lawless and Searle, "*Kinetics of the Reaction Between Phosphine and Sodium Hypochlorite in Alkaline Solution*", J. Chem. Soc. 1962, 4200–5).

2. Prior Art

It is known that hypophosphorous acid ($H_3PO_2$) may be converted to sodium hypophosphite by reaction with sodium hydroxide. It is also known that phosphine can be converted to hypophosphorous acid by passing the phosphine into an aqueous suspension of iodine until it is colorless and repeatedly distilling to remove the hydrogen iodide to leave pure hypophosphorous acid. (See, for example, Kirk-Othmer Encyclopedia of Chemical Technology, Vol. 15, Second Completely Revised Edition, 1968). It is also known that phosphine may be oxidized in the presence of chlorine (Chem. Abst., Vol. 76, 1972, 63977p).

It is also known that phosphine can react with hydrogen peroxide in the presence of catalysts such as potassium iodide (C.A., Vol. 76, 1972,145334r), bromide ions (C.A., Vol. 76, 1972,50585j), copper (II) (C.A., Vol. 84, 1976,65680a), certain iodide and bromide iron complexes (C.A., Vol. 82, 1975,160755s), and iron (III) bromide and lithium chloride (C.A., Vol. 82, 1975,48123n).

A process to selectively convert byproduct phosphine (which, for example, is produced from reacting phosphorus and an aqueous metal hydroxide solution and contains hydrogen) to hypophosphorous acid and then to sodium hypophosphite through any of these aforementioned catalytic routes would not be satisfactory since such catalytic processes tend to produce large amounts of phosphorous acid ($H_3PO_3$) and phosphoric acid ($H_3PO_4$) rather than hypophosphorous acid ($H_3PO_2$), i.e. the catalytic processes tend to oxidize the phosphine to too great an extent. Additionally, the catalyst tends to decompose the hydrogen peroxide to water and oxygen. Such decomposition is economically undesirable and presents a hazard.

Paris and Tardy, COMPT. rend 223 (1946) 242/3 indicates that phosphine can be oxidized by hydrogen peroxide to hypophosphorous acid in the absence of a catalyst. Z. Anorg. Allgem. Chem. 121 (1922) 73194, 75 and Sokol 'Skii. D. V., et al. (USSR), Gomogen Kataliz, 1970, 79–89, abstracted in C.A., Vol. 76, 1972, 145334r indicates that phosphine *cannot* be oxidized by hydrogen peroxide in the absence of a catalyst. Thus, there is confusion by those skilled in the art whether phosphine can be selectively oxidized by hydrogen peroxide in the absence of a catalyst and, if so, under what conditions.

SUMMARY OF THE INVENTION

It is an object of this invention to selectively produce hypophosphorous acid from phosphine.

It is a further object of the invention to produce non-transition metal hypophosphites from said hypophosphorous acid.

It is a further object of this invention to convert a substantial portion of byproduct phosphine, produced from the production of hypophosphites, to said hypophosphite.

It is a provision of this invention to provide a process for producing hypophosphorous acid ($H_3PO_2$) by reacting, in the absence of a catalyst and under an acidic condition, phosphine with an aqueous solution of hydrogen peroxide to produce an acid solution containing the hypophosphorous acid.

The process further comprises contacting the acid solution produced with a non-transition metal hydroxide, oxide or carbonate to produce a product composition containing a hypophosphite.

It is a further provision of this invention to provide in a process for producing a non-transition metal hypophosphite of the type wherein phosphorus is reacted with an aqueous non-transition metal hydroxide composition to produce the hypophosphite and byproduct phosphine, the improvement comprising converting a substantial portion of the byproduct phosphine to hypophosphite by reacting, in the absence of a catalyst and under an acidic condition, phosphine with an aqueous solution of hydrogen peroxide to produce an acid solution containing hypophosphorous acid ($H_3PO_2$) and then contacting the acid solution with a non-transition metal hydroxide, oxide or carbonate to produce a product composition containing the hypophosphite.

DETAILED DESCRIPTION OF THE INVENTION

It is believed that the process for producing hypophosphorous acid from phosphine and hydrogen peroxide proceeds as follows:

FORMULA 1

$$PH_3 + 2H_2O_2 \xrightarrow{\text{acid condition}} H_3PO_2 + 2H_2O$$

It is believed that the process for producing the non-transition metal hypophosphite from the hypophosphorous acid and non-transition metal hydroxide, oxide or carbonate proceeds as follows:

FORMULA 2A

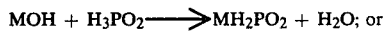

$$MOH + H_3PO_2 \longrightarrow MH_2PO_2 + H_2O; \text{ or}$$

FORMULA 2B

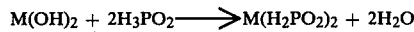

$$M(OH)_2 + 2H_3PO_2 \longrightarrow M(H_2PO_2)_2 + 2H_2O$$

wherein "M" is a non-transition metal. By the use of the term "non-transition metal" it is preferably meant the metals in Group IA and IIA of the Periodic Table; are specifically in Group IA: lithium, sodium, potassium, rubidium, cesium; and in Group IIA: magnesium, calcium, strontium and barium. (See Periodic Table in "Perrys Chemical Engineers Handbook", Fourth Edition, 1963, McGraw Hill Book Company, Inc.) A particularly preferred non-transition metal is sodium. As used in this invention, one skilled in the art would also consider ammonium hydroxide equivalent to a non-transition metal hydroxide.

Typically, the phosphine is reacted with the hydrogen peroxide by contacting a stream of phosphine with an acidic aqueous solution of hydrogen peroxide. This may be done in a batch or continuous type process. A continuous type process is generally preferred, with a continuous type countercurrent process being highly preferred. The commercial process for producing, for example, sodium hypophosphite, by reacting phosphorus with an aqueous suspension of sodium and calcium hydroxide, produces a byproduct phosphine stream which has contained therein a certain amount of hydrogen as well as nitrogen. It has been found that an advantage of the process of this invention, is that the hydrogen does not adversely affect the chemistry of the process.

In the production of hypophosphorous acid by the process of this invention, certain byproducts, in particular, phosphorous acid ($H_3PO_3$) and phosphoric acid ($H_3PO_4$) are produced. It is believed that the byproduct phosphorous acid is produced by the oxidation of hypophosphorous acid:

FORMULA 3

$$H_3PO_2 + H_2O_2 \longrightarrow H_3PO_3 + H_2O$$

It is believed that the byproduct phosphoric acid is produced by the oxidation of the phosphorous acid:

FORMULA 4

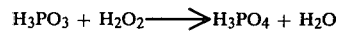

$$H_3PO_3 + H_2O_2 \longrightarrow H_3PO_4 + H_2O$$

The mechanism and kinetics of the oxidation of hypophosphorous acid and phosphorous acid, to, respectively, phosphorous acid and phosphoric acids with hydrogen peroxide is described in A. G. Mircshnichenko et al., Russian Journal of Inorganic Chemistry, 15, 1345 (1970).

The predominant byproduct is phosphorous acid, which can be up to about 15% by weight of the phosphorus containing acids produced. Phosphoric acid can be less than about 1% of the phosphorus containing acids produced.

The acid solution produced from the process of this invention is then contacted with a non-transition metal hydroxide, oxide or carbonate, preferably sodium hydroxide, to produce a product composition containing a hypophosphite, e.g., sodium hypophosphite.

The amount of hydroxide, oxide or carbonate used is an amount sufficient to react with all of the acid present in the acid solution. In effect, the hydroxide, oxide or carbonate is added to neutralize the acid solution.

In the process of this invention, the acid condition of the aqueous solution of hydrogen peroxide is particularly critical. The aqueous solution must be maintained at a pH below about 7 in order to prevent decomposition of the hydrogen peroxide. Preferably, this pH is less than about 6. It has been found that generally as the pH is lowered, the conversion and conversion rate of phosphine to phosphorus containing acids increases but the selectivity decreases. In effect, there is a greater amount of phosphine converted to phosphorus containing acids, but a greater percent of byproducts produced, e.g., phosphorous acid and phosphoric acid. This is particularly true at a pH less than 3.

The term "conversion" as used herein means the amount or percentage of phosphine converted to phosphorus containing acids, e.g. hypophosphorous, phosphorous and phosphoric acids.

The term "selectivity" as used herein means the amount in moles or mole percent of hypophosphorous acid produced compared to the total moles of phosphorus containing acids produced, e.g. hypophosphorous, phosphorous and phosphoric acid.

It is possible to increase the conversion and conversion rate of phosphine to a maximum by lowering the pH to less than about 1, e.g., 0.5, by starting with a quantity of hypophosphorous acid in the aqueous solution of hydrogen peroxide. Thus, a method of reacting phosphine with hydrogen peroxide is to initially accomplish such reaction in the presence of a quantity of hypophosphorous acid to initially produce the acidic condition.

Additionally, it has been found that the higher the pH of the aqueous solution of hydrogen peroxide the greater the loss of hydrogen peroxide. It has been found that at a pH greater than 3, there is a substantial loss, e.g. 15% to 30%, of hydrogen peroxide. This loss is probably due either to the reduction of hydrogen peroxide by the hydrogen present in the byproduct phosphine stream and/or to the decomposition of the hydrogen peroxide to water and oxygen. It has been found that hydrogen peroxide loss may be minimized, e.g. less than 5% by carrying out the reaction at a pH less than 2. Loss of hydrogen peroxide by decomposition to water and oxygen should be avoided both for economical reasons and safety in that the mixing of the oxygen with hydrogen contained in the byproduct phosphine stream may produce an explosive mixture.

During the course of reacting phosphine with the aqueous solution of hydrogen peroxide, as greater quantities of hypophosphorous acid are produced, the pH of the reaction mixture decreases. In a continuous commercial process, it may be desirable to maintain a constant pH. This results in consistent conversions, conversion rates and selectivity. Thus, a preferred method of carrying out the process of this invention is to maintain a substantially constant pH or acidic condition. This substantially constant pH may be maintained by contacting the acidic solution with a sufficient quantity of the non-transition metal hydroxide, oxide or carbonate to maintain the acidic condition at a substantially constant pH. Such a procedure not only maintains a substantially constant pH, but simultaneously produces the product composition containing the hypophosphite.

The hydrogen peroxide is used in an aqueous solution. It is preferred that the concentration of the hydrogen peroxide in the aqueous solution be from about 1% to about 50%, by weight.

As can be seen from Formula 1, the hydrogen peroxide reacts stoichiometrically with the phosphine at a molar ratio of hydrogen peroxide to phosphine of 2:1. It has been found that a preferred molar ratio of hydrogen peroxide to phosphine is from about 0.1:1 to about 30:1. Higher molar excesses of hydrogen peroxide are not preferred for economical reasons and the fact that excess hydrogen peroxide must be removed because it tends to oxidize the hypophosphite produced. Thus, a highly preferred molar ratio of hydrogen peroxide to phosphine is from about 0.75:1 to about 3:1.

Preferably, the phosphine is reacted with the hydrogen peroxide at a temperature of from about 5° C. to about 60° C., with 20° C. to about 45° C. being highly preferred. Generally, it has been found that elevated temperatures, e.g. above 45° C., tend to decrease selectivity, however, conversion and conversion rates increase.

Preferably, the byproduct phosphorous acid and phosphoric acid are removed from the acid solution by contacting the acid solution with calcium ions to precipitate out the phosphorous acid and phosphoric acids contained therein. The calcium ions maybe produced by calcium hydroxide—Ca(OH)$_2$, calcium oxide—CaO, or calcium carbonate—CaCO$_3$.

It is believed that the following reactions occur:

FORMULA 5

$$H_3PO_3 + Ca(OH)_2 \longrightarrow [CaHPO_3] + 2H_2O$$

FORMULA 6

-continued $$H_3PO_4 + Ca(OH)_2 \longrightarrow [CaHPO_4] + 2H_2O$$

The exact form of the calcium phosphite and phosphate has not been determined.

Preferably the calcium ions are contacted with the acid solution prior to contacting the acid solution with the non-transition metal hydroxide, oxide or carbonate used to produce the hypophosphite. The pH of the acid solution must be less than about 6, or the calcium hydroxide, calcium oxide or calcium carbonate may not substantially dissolve.

It is highly desirable that any residual hydrogen peroxide be removed from the product composition. The presence of hydrogen peroxide is potentially dangerous and can oxidize the hypophosphite produced. A preferred process for removing residual hydrogen peroxide is by contacting the product composition with activated carbon. An activated carbon should be selected which does not promote the oxidation of the hypophosphite. A particularly preferred activated carbon is "CHARCOAL NORIT A" from Matheson, Colleman and Bell, an activated carbon of vegetable origin. The resulting product is then filtered and the calcium precipitate, e.g. phosphite and phosphate and activated carbon is separated from the hypophosphite.

Any residual hydrogen peroxide may be detected by testing with Ti$^{+4}$, see, for example, "H$_2$O$_2$, Technical and Safety Data", FMC Corporation: *Kirk-Othmer Encyclopedia of Chemical Technology*, 2nd Completely Revised Edition, Vol. 11, 1966 and W. C. Schumb, C. N. Satterfield and R. L. Wentworth, "*Hydrogen Peroxide*", Reinhold Publishing Corporation, New York, 1955. The quantities of hydrogen peroxide remaining in the product composition may be analyzed by spectrophotometric methods. Additionally, nuclear magnetic resonance methods may be used to quantatively assay the oxidized phosphine solutions. These methods are well known in the art.

The process of this invention finds particular use in processes for producing a non-transition metal hypophosphite of the type wherein phosphorus, e.g. yellow phosphorus (P$_4$), is reacted with an aqueous non-transition metal hydroxide composition, e.g. a sodium hydroxide and calcium hydroxide suspension, to produce hypophosphite and byproduct phosphine. The process of this invention is used to convert a substantial portion of the byproduct phosphine to hypophosphite thus enhancing the economics of the reaction.

The following examples serve to illustrate the invention and its advantages.

EXAMPLES 1–11

Thirty-three (33) tests were performed utilizing a cylindrical, baffled reactor fitted with a thermometer, pH electrode, glass stirrer, dropping funnel for alkaline metal hydroxide and gas inlet at the bottom of the reactor. The reactor was immersed in an ice bath to maintain temperature.

The procedure followed in Example 32 will be detailed below. Similar procedures were utilized for Examples 1–31 and 33. A summary of the parameters and results from Examples 1–33 are presented.

PROCEDURE FOR EXAMPLE 32

This test does not use the addition of sodium hydroxide during the reaction of phosphine with the hydrogen peroxide to maintain pH.

1. The reactor was flushed with nitrogen for 30 minutes.
2. 200 ml. of a 22.4% aqueous solution of hydrogen peroxide was transferred into the reactor through the thermometer fitting, by temporarily removing the thermometer. The thermometer and the pH electrode were placed in the reactor. The lower part of the pH electrode was immersed in the aqueous solution of hydrogen peroxide. A pH of 4.12 and temperature of 22° C. were recorded. The nitrogen purge continued during the addition of the aqueous solution of hydrogen peroxide so as to exclude oxygen from the system.
3. Phosphine flow to the reactor and the stirrer (1250 RPM) were turned on. The pH, temperature and time were recorded:

TABLE A

| TIME (Min.) | pH | Temp. °C. |
| --- | --- | --- |
| 0 | 4.05 | 22 |
| 1 | 4.05 | 22 |
| 1.5 | 4.05 | 22 |
| 2 | 3.60 | 22 |
| 2.5 | 3.24 | 22 |

4. At time 2.5 min., nitrogen flow to the reactor was shut off and the hydrogen flow turned on. A $PH_3:H_2$ molar ratio of 1.:1.2 was utilized. This is the molar ratio observed during commercial processes for producing hypophosphite from phosphorus.

The pH, temperature and time were recorded. The temperature was adjusted by regulating the depth to which the reactor was immersed in the ice water bath:

TABLE B

| TIME (Min.) | pH | Temp. °C. | REMARKS |
| --- | --- | --- | --- |
| 3 | 2.93 | 22 | |
| 3.5 | 2.60 | 22 | |
| 4 | 2.35 | 23 | |
| 4.5 | 2.15 | 23 | |
| 5 | 1.99 | 24 | |
| 5.5 | 1.86 | 24 | |
| 6 | 1.76 | 24 | |
| 6.5 | 1.65 | 24 | |
| 7 | 1.62 | 25 | Cooling of the reactor |
| 7.5 | 1.56 | 25 | |
| 8 | 1.52 | 25 | |
| 8.5 | 1.48 | 25 | |
| 9 | 1.46 | 25 | |
| 9.5 | 1.43 | 25 | |
| 10 | 1.41 | 25 | |
| 10.5 | 1.39 | 25 | |
| 11 | 1.37 | 25 | |
| 11.5 | 1.35 | 25 | |
| 12 | 1.33 | 25 | |
| 13 | 1.30 | 25 | |
| 14 | 1.28 | 25 | |
| 15 | 1.25 | 25 | |
| 16 | 1.23 | 25 | |
| 17 | 1.21 | 25 | |
| 18 | 1.20 | 25 | |
| 20 | 1.17 | 25 | |
| 22 | 1.14 | 25 | |
| 24 | 1.13 | 25 | Reaction solution acquired a milky appearance. |
| 26 | 1.11 | 25 | |
| 28 | 1.09 | 25 | |
| 30 | 1.07 | 25 | |
| 32 | 1.05 | 25 | |

TABLE B-continued

| TIME (Min.) | pH | Temp. °C. | REMARKS |
| --- | --- | --- | --- |
| 34 | 1.03 | 25 | 20 ml. of ice-cold water added to bath. |
| 36 | 1.02 | 25 | |
| 38 | 1.01 | 25 | |
| 40 | 1.00 | 25 | |
| 48 | 0.97 | 25 | |
| 53 | 0.94 | 26 | 40 ml. of ice-cold water added to bath. |
| 58 | 0.93 | 25 | |
| 68 | 0.92 | 25 | |
| 78 | 0.90 | 25 | |
| 83 | 0.89 | 22.5 | 90 ml. of ice-cold water added to bath. |
| 88 | 0.89 | 25 | |
| 98 | 0.87 | 25.5 | 110 ml. of ice-cold water added to bath. |
| 108 | 0.86 | 25 | |
| 113 | 0.86 | 26 | Ice added. |

5. At 113 minutes the hydrogen cylinder valve was closed.
6. At 115 minutes the phosphine cylinder valve was closed.
7. At 118 minutes the hydrogen flow had stopped and nitrogen flow started.
8. At 124 minutes the phosphine flow having stopped, the stirrer speed was reduced to 600 rpm. This was considered the end of the run.
9. At 126 minutes the purge of the phosphine line with nitrogen was started. It continued for 30 minutes. During this period the reaction mixture was cooled to 10° C.
10. 35 minutes after the end of the run, a 5 ml. aliquot of the 206 ml. acid solution was withdrawn and the $P^{31}$ NMR of the solution recorded. The product distribution (peak by area percent) was 86% hypophosphorous acid, 13% phosphorous acid and 1% phosphoric acid.
11. 35 minutes after the end of the run another 5 ml. acid solution aliquot was withdrawn and transferred to a 1,000 ml. volumetric flask containing about 500 ml. of distilled water. Additional water was added to bring the volume to 1,000 ml. mark. The solution was analyzed for hydrogen peroxide by spectrophotometry.
12. 1 hour and 10 minutes after the end of the run, 10 ml. of the acid solution was diluted with 30 ml. of distilled water and titrated to pH 7 using 1 N sodium hydroxide solution. Phenolphthalein solution was used as the indicator. 14.4 ml. of 1 N sodium hydroxide solution were required to neutralize the solution. Accordingly, 296.6 ml. of 1 N sodium hydroxide solution would be necessary to neutralize the entire acid solution. This number divided by $1,000 \times 1.15$ gives the moles of phosphine that reacted with the hydrogen peroxide, i.e. 0.258 mole. The 1.15 factor was obtained from the product distribution calculated from the peak area present in the $P^{31}$ NMR (Step 10), i.e., $1 \times 0.86$ for $H_3PO_2$, $2 \times 0.13 = 0.26$ for $H_3PO_3$ and $3 \times 0.01 = 0.03$ for $H_3PO_4$. $(0.86 + 0.26 + 0.03 = 1.15)$. This number was compared later with the results from total P analysis of an aliquot of the acid solution which had only been treated with activated carbon, i.e. "NORIT A" (Step 20).
13. 1 hour 50 minutes after the end of the reaction 150 ml. of the acid solution was transferred to a 400 ml. beaker which was cooled in a bath with ice and water. According to the $P^{31}$ NMR this acid solution contains in addition to $H_3PO_2$, $0.258 \times 0.13 \times 150/206 = 0.0244$ moles of $H_3PO_3$ and $0.258 \times 0.01 \times 150/206 = 0.0018$ moles of $H_3PO_4$.

14. Calcium hydroxide was used to precipitate $H_3PO_3$ and $H_3PO_4$ from the acid solution of Step 13. Thus, $0.0244 + 0.0018 = 0.0262$ moles of calcium hydroxide were required, or 1.94 grams. 2 grams of 99.3% calcium hydroxide were added, all at once, into the stirred acid solution. The solid calcium hydroxide dissolved within 3 minutes. The pH of the calcium hydroxide treated solution was found to be 1.57 at 8° C.

15. A 5 N 150 ml. of sodium hydroxide solution was then used to neutralize the acid solution from Step 14 to form a neutralized product composition. The temperature was maintained below 16° C. A total of 33.7 ml. of 5 N sodium hydroxide solution were used to bring the pH to 7.25. A white precipitate, probably $CaHPO_3.\frac{2}{3}H_2O$, was formed at pH 5.6. The neutralization was completed two hours and five minutes after the end of the reaction. It should be noted that the moles of $OH^-$ ion used was 2.8% greater than the 0.216 moles of sodium hydroxide calculated from the original titration. This suggests that additional oxidation took place, i.e., about 3% oxidation of hypophosphite to phosphite, during the elapsed hour.

16. Two grams of "NORIT A" (CX 655 from Matheson Colleman and Bell) was added to the neutralized product composition of Step 15. There was an immediate vigorous effervescence. The beaker was covered with a watch glass and a thermometer was immersed in the solution. The temperature started rising and about 25 minutes after the addition of the carbon, it reached 53° C. It decreased thereafter. At 37 minutes after the addition of the carbon, the temperature was 40° C. The suspension was allowed to react overnight.

17. The phosphine cylinder was weighted. The phosphine used was determined to be 24.5 grams (0.721 moles). Accordingly, the priliminary conversion was calculated to be about 35.8%.

18. The suspension from Step 16 was filtered and the solids were washed three times with distilled water. The combined filtrate was 232 ml. A $Ti^{+4}$ spot test showed that there was no hydrogen peroxide remaining. A $P^{31}$ NMR analysis of the filtrate showed 96% hypophoshophite, 4% phosphite as measured by peak area percent of $P^{31}$ NMR.

19. An aliquot of the 232 ml. filtrate from Step 18 was submitted for total phosphorus analysis. It was found to contain 2.20% phosphorus by volume or 0.226 moles of phosphorous. Thus, the calcium hydroxide treatment was estimated to have removed 13.4% of the phosphorous value. This amount is equal to phosphorous acid produced in the process.

20. 25 ml. of the original acid solution remaining was treated with 0.3 grams of "NORIT A", allowed to react overnight and filtered. The solids were washed with distilled water three times and the resulting filtrate (171 ml.) was submitted for total phosphorus analysis. The results indicated that the filtrate contained 1.38% phosphorus by volume. Accordingly, the moles of phosphine reacted were 0.261 moles. The value is very close to the value obtained from $P^{31}$ NMR and acid titrations 0.258 moles of phosphine. The phosphine conversion based on P analysis is equal to 36.2%.

SUMMARY OF EXAMPLES 1-33

EXAMPLE 1

Hydrogen Peroxide Used:
  30.2% concentration
  1000 milliliters
  9.85 moles
Phosphine Used:
  0.68 moles at 0.010 moles/minute
Amount of Phosphine Reacted with $H_2O_2$
  0.41 moles
Reaction Time: 1 hr. 07 min.
Temperature of Reaction: 24°-25° C.
pH of Aqueous Solution of $H_2O_2$: 5±2
  pH controlled
Stirrer Rate: 2300 RPM
Conversion of $PH_3$: 60%
Selectivity: 100% hypophosphite
Ratio of $PH_3:N_2$ Used: 1:1

EXAMPLE 2

Hydrogen Peroxide Used:
  30.2% concentration
  1000 milliliters
  9.85 moles
Phosphine Used:
  1.21 moles at 0.010 moles/minute
Amount of Phosphine Reacted with $H_2O_2$
  0.77 moles
Reaction Time: 1 hr. 59 min.
Temperature of Reaction: 25°±3° C.
pH of Aqueous Solution of $H_2O_2$: 5±2
  pH controlled
Stirrer Rate: 2300 RPM
Conversion of $PH_3$: 63.6%
Selectivity: 96% hypophosphite
Ratio of $PH_3:N_2$ used: 1:1

EXAMPLE 3

Hydrogen Peroxide Used:
  30.2% concentration
  1000 milliliters
  9.85 moles
Phosphine Used:
  0.59 moles at 0.005 moles/minute
Amount of Phosphine Reacted with $H_2O_2$
  0.43 moles
Reaction Time: 2 hr. 00 min.
Temperature of Reaction: 15°±5° C.
pH of Aqueous Solution of $H_2O_2$: 5±2
  pH controlled
Stirrer Rate: 2300 RPM
Conversion of $PH_3$: 72.9%
Selectivity: 99% hypophosphite
Ratio of $PH_3:N_2$ Used: 1:1

EXAMPLE 4

Hydrogen Peroxide Used:
  30.2% concentration
  1000 milliliters
  9.85 moles
Phosphine Used:
  0.88 moles at 0.007 moles/minute
Amount of Phosphine Reacted with $H_2O_2$
  0.86 moles
Reaction Time: 2 hr. 00 min.
Temperature of Reaction: 20°-23° C.
pH of Aqueous Solution of $H_2O_2$: 5±2
  pH controlled
Stirrer Rate: 2300 RPM
Conversion of $PH_2$: 97.7%

Selectivity: 98% hypophosphite
N$_2$ not used in run

EXAMPLE 5

Hydrogen Peroxide Used:
  30.2% concentration
  1000 milliliters
  9.85 moles
Phosphine Used:
  1.24 moles at 0.010 moles/minute
Amount of Phosphine Reacted with H$_2$O$_2$
  0.82 moles
Reaction Time: 2 hr. 00 min.
Temperature of Reaction: 41°–43° C.
pH of Aqueous Solution of H$_2$O$_2$: 5±2
  pH controlled
Stirrer Rate: 2300 RPM
Conversion of PH$_3$: 66.1%
Selectivity: 85% hypophosphite
Ratio of PH$_3$:N$_3$ Used: 1:1

EXAMPLE 6

Hydrogen Peroxide Used:
  3.0% concentration
  1000 milliliters
  0.98 moles
Phosphine Used:
  0.60 moles at 0.012 moles/minute
Amount of Phosphine Reacted with H$_2$O$_2$
  0.096 moles
Reaction Time: 0 hr. 50 min.
Temperature of Reaction: 22°–23° C.
pH of Aqueous Solution of H$_2$O$_2$: 5±2
  pH controlled
Stirrer Rate: 2300 RPM
Conversion of PH$_3$: 16%
Selectivity: 100% hypophosphite
N$_2$ not used in run

EXAMPLE 7

Hydrogen Peroxide Used:
  3.0% concentration
  1000 milliliters
  0.98 moles
Phosphine Used:
  0.50 moles at 0.010 moles/minute
Amount of Phosphine Reacted with H$_2$O$_2$
  0.208 moles
Reaction Time: 0 hr. 50 min.
Temperature of Reaction: 42°–43° C.
pH of Aqueous Solution of H$_2$O$_2$: 5±2
  pH controlled
Stirrer Rate: 2300 RPM
Conversion of PH$_3$: 41.6%
Selectivity: 98% hypophosphite
N$_2$ not used in run

EXAMPLE 8

Hydrogen Peroxide Used:
  3.0% concentration
  1000 milliliters
  0.98 moles
Phosphine Used:
  0.44 moles at 0.009 moles/minute
Amount of Phosphine Reacted with H$_2$O$_2$
  0.157 moles
Reaction Time: 00 hr. 50 min.
Temperature of Reaction: 51°–56° C.
pH of Aqueous Solution of H$_2$O$_2$: 5±2
Stirrer Rate: 2300 RPM
Conversion of PH$_3$: 35.7% Selectivity: 61% hypophosphite
N$_2$ not used in run

EXAMPLE 9

Hydrogen Peroxide Used:
  30.2% concentration
  1000 milliliters
  9.85 moles
Phosphine Used:
  0.38 moles at 0.0055 moles/minute
Amount of Phosphine Reacted with H$_2$O$_2$
  0.323 moles
Reaction Time: 1 hr. 09 min.
Temperature of Reaction: 24°–26° C.
pH of Aqueous Solution of H$_2$O$_2$: 3→1.2
  No pH control
Stirrer Rate: 2300 RPM
Conversion of PH$_3$: 85%
Selectivity: 98% hypophosphorous acid
Ratio of PH$_3$:N$_2$ Used: 1:1

EXAMPLE 10

Hydrogen Peroxide Used:
  3.0% concentration
  1000 milliliters
  0.98 moles
Phosphine Used:
  0.50 moles at 0.010 moles/minute
Reaction Time: 00 hr. 50 min.
Temperature of Reaction: 25° C.
pH of Aqueous Solution of H$_2$O$_2$: 3.5→2.1
  No pH control
Stirrer Rate: 2300 RPM
Conversion of PH$_3$: 20.6%
Selectivity: 95% hypophosphorous acid
N$_2$ not used in run

EXAMPLE 11

Hydrogen Peroxide Used:
  3.0% concentration
  1000 milliliters
  0.98 moles
Phosphine Used:
  0.50 moles of 0.010 moles/minute
Amount of Phosphine Reacted with H$_2$O$_2$
  0.103 moles
Reaction Time: 51 min.
Temperature of Reaction: 25° C.
pH of Aqueous Solution of H$_2$O$_2$: 4.5→2.1
  No pH control
Stirrer Rate: 2300 RPM
Conversion of PH$_3$: 20.6%
Selectivity: 99% hypophosphorus acid
N$_2$ not used in run

EXAMPLE 12

Hydrogen Peroxide Used:
  3.0% concentration
  250 milliliters
  0.245 moles
Phosphine Used:
  0.22 moles at 0.0037 moles/minute
Amount of Phosphine Reacted with H$_2$O$_2$ 0.023 moles
Reaction Time: 1 hr. 00 min.
Temperature of Reaction: 22°–28° C.
pH of Aqueous Solution of $H_2O_2$: 4.1→1.9
 No pH control
Stirrer Rate: 1100 RPM
Conversion of $PH_3$: 10.5%
Selectivity: 99% hypophosphorus acid
$N_2$ not used in run

EXAMPLE 13

Hydrogen Peroxide Used:
 3.0% concentration
 200 milliliters
 0.197 moles
Phosphine Used:
 0.044 moles at 0.0007 moles/minute
Amount of Phosphine Reacted with $H_2O_2$
 0.015 moles
Reaction Time: 1 hr. 00 min.
Temperature of Reaction: 25° C.
pH of Aqueous Solution of $H_2O_2$: 4.6→2.0
 No pH control
Stirrer Rate: 1400 RPM
Conversion of $PH_3$: 34.1%
Selectivity: 97% hypophosphorous acid
$N_2$ not used in run

EXAMPLE 14

Hydrogen Peroxide Used:
 30.2% concentration
 200 milliliters
 1.97 moles
Phosphine Used:
 0.853 moles at 0.0071 moles/minute
Amount of Phosphine Reacted with $H_2O_2$
 0.755 moles
Reaction Time: 2 hr. 00 min.
Temperature of Reaction: 22°–31° C.
pH of Aqueous Solution of $H_2O_2$: 2.9→0.6
 No pH control
Stirrer Rate: 1400 RPM
Conversion of $PH_3$: 88.5%
Selectivity: 85% hypophosphorous acid
$N_2$ not used in run

EXAMPLE 15

Hydrogen Peroxide Used:
 30.2% concentration
 200 milliliters
 1.97 moles
Phosphine Used:
 0.971 moles at 0.0081 moles/minute
Amount of Phosphine Reacted with $H_2O_2$
 0.521 moles
Reaction Time: 2 hr. 00 min.
Temperature of Reaction: 18°–28° C.
pH of Aqueous Solution of $H_2O_2$: 2.9⇌1.8
 pH control with NaOH
Stirrer Rate: 1400 RPM
Conversion of $PH_3$: 54%
Selectivity: 82% hypophosphite
$N_2$ not used in run

EXAMPLE 16

Hydrogen Peroxide Used:
 30.2% concentration
 200 milliliters
 1.97 moles
Phosphine Used:
 0.882 moles at 0.0074 moles/minute
Amount of Phosphine Reacted with $H_2O_2$
 0.21 moles
Reaction Time: 2 hr. 00 min.
Temperature of Reaction: 16°–28° C.
pH of Aqueous Solution of $H_2O_2$: 3⇌7.3
 pH control with NaOH
Stirrer Rate: 1400 RPM
Conversion of $PH_3$: 23.8%
Selectivity: 93% hypophosphite
Ratio of $PH_3$:$N_2$ Used: 1:1

EXAMPLE 17

Hydrogen Peroxide Used:
 30.2% concentration
 200 milliliters
 1.97 moles
Phosphine Used:
 1.324 moles at 0.011 moles/minute
Amount of Phosphine Reacted with $H_2O_2$
 0.493 moles
Reaction Time: 2 hr. 00 min.
Temperature of Reaction: 22°–25° C.
pH of Aqueous Solution of $H_2O_2$: 4.3→0.6
 No pH control
Stirrer Rate: 1400 RPM
Conversion of $PH_3$: 37.2%
Selectivity: 92% hypophosphorous acid
Ratio of $PH_3$:$N_2$ Used: 1:1

EXAMPLE 18

Hydrogen Peroxide Used:
 30.2% concentration
 200 milliliters
 1.97 moles
Phosphine Used:
 0.588 moles at 0.0024 moles/minute
Amount of Phosphine Reacted with $H_2O_2$
 0.454 moles
Reaction Time: 4 hr. 00 min.
Temperature of Reaction: 20°–27° C.
pH of Aqueous Solution of $H_2O_2$: 2.4→0.5
 No pH control
Stirrer Rate: 1400 RPM
Conversion of $PH_3$: 77.2%
Selectivity: 88% hypophosphorous acid
Ratio of $PH_3$:$N_2$ Used: 1:1

EXAMPLE 19

Hydrogen Peroxide Used:
 22.4% concentration
 200 milliliters
 1.42 moles
Phosphine Used:
 0.412 moles at 0.0034 moles/minute
Amount of Phosphine Reacted with $H_2O_2$
 0.286 moles
Reaction Time: 2 hr. 02 min.
Temperature of Reaction: 21°–26° C.
pH of Aqueous Solution of $H_2O_2$: 2.8→0.6
 No pH control
Stirrer Rate: 1400 RPM
Conversion of $PH_3$: 69.4%
Selectivity: 92% hypophosphorous acid Ratio of $PH_3:N_2$ Used: 1:1

EXAMPLE 20

Hydrogen Peroxide Used:
  22.4% concentration
  200 milliliters
  1.42 moles
Phosphine Used:
  0.588 moles at 0.0049 moles/minute
Amount of Phosphine Reacted with $H_2O_2$
  0.185 moles
Reaction Time: 2 hr. 00 min.
Temperature of Reaction: 22°–25° C.
pH of Aqueous Solution of $H_2O_2$: 3±0.5
  pH control with NaOH
Stirrer Rate: 1400 RPM
Conversion of $PH_3$: 31.5%
Selectivity: 100% hypophosphite
Ratio of $PH_3:N_2$ Used: 1:1

EXAMPLE 21

Hydrogen Peroxide Used:
  22.4% concentration
  200 milliliters
  1.42 moles
Phosphine Used:
  0.603 moles at 0.0044 moles/minute
Amount of Phosphine Reacted with $H_2O_2$
  0.222 moles
Reaction Time: 2 hr. 17 min.
Temperature of Reaction: 15°–25° C.
pH of Aqueous Solution of $H_2O_2$: 4.2→1.2
  No pH control
Stirrer Rate: 1400 RPM
Conversion of $PH_3$: 36.8%
Selectivity: 61% hypophosphorous acid
Ratio of $PH_3:H_2$ Used: 1:1.2

EXAMPLE 22

Hydrogen Peroxide Used:
  22.4% concentration
  200 milliliters
  1.42 moles
Phosphine Used:
  0.456 moles at 0.0037 moles/minute
Amount of Phosphine Reacted with $H_2O_2$
  0.151 moles
Reaction Time: 2 hr. 02 min.
Temperature of Reaction: 22°–28° C.
pH of Aqueous Solution of $H_2O_2$: Unknown
Stirrer Rate: 1400 RPM
Conversion of $PH_3$: 31%
Selectivity: 62% hypophosphorous acid
Ratio of $PH_3:H_2$ Used: 1:1.4

On Examples 21 and 22, the metal stirrer used caused metal ion contamination which decreased selectivity in the presence of hydrogen.

Examples 23 to 33 a glass stirrer was used to prevent decreased selectivity.

EXAMPLE 23

Hydrogen Peroxide Used:
  22.4% concentration
  200 milliliters
  1.42 moles
Phosphine Used:
  0.544 moles at 0.0045 moles/minute
Amount of Phosphine Reacted with $H_2O_2$
  0.126 moles
Reaction Time: 2 hr. 00 min.
Temperature of Reaction: 19°–25° C.
pH of Aqueous Solution of $H_2O_2$: 3±0.5
  pH control with NaOH
Stirrer Rate: 1250 RPM
Conversion of $PH_3$: 23.2%
Selectivity: 98% hypophosphite
Ratio of $PH_3:H_2$ Used: 1:1.2

EXAMPLE 24

Hydrogen Peroxide Used:
  30.2% concentration
  200 milliliters
  1.97 moles
Phosphine Used:
  0.97 moles at 0.0078 moles/minute
Amount of Phosphine Reacted with $H_2O_2$
  0.395 moles
Reaction Time: 2 hr. 04 min.
Temperature of Reaction: 19°–27° C.
pH of Aqueous Solution of $H_2O_2$: 6.2→0.8
  No pH control
Stirrer Rate: 1250 RPM
Conversion of $PH_3$: 40.1%
Selectivity: 81% hypophosphorous acid
Ratio of $PH_3:H_2$ Used: 1:1.2

EXAMPLE 25

Hydrogen Peroxide Used:
  22.4% concentration
  200 milliliters
  1.42 moles
Phosphine Used:
  0.676 moles at 0.0057 moles/minute
Amount of Phosphine Reacted with $H_2O_2$
  0.178 moles
Reaction Time: 1 hr. 58 min.
Temperature of Reaction: 21°–25° C.
pH of Aqueous Solution of $H_2O_2$: 2
  pH control with NaOH
Stirrer Rate: 1250 RPM
Conversion of $PH_3$: 26.3%
Selectivity: 94% hypophosphite
Ratio of $PH_3:H_2$ Used: 1:1.1

EXAMPLE 26

Hydrogen Peroxide Used:
  22.4% concentration
  200 milliliters
  1.42 moles
Phosphine Used:
  0.706 moles at 0.0029 moles/minute
Amount of Phosphine Reacted with $H_2O_2$
  0.205 moles
Reaction Time: 4 hr. 00 min.
Temperature of Reaction: 20°–25° C.
pH of Aqueous Solution of $H_2O_2$: 3.
  pH control with NaOH
Stirrer Rate: 1250 RPM
Conversion of $PH_3$: 29%
Selectivity: 97% hypophosphite
Ratio of $PH_3:H_2$ Used: 1:1.2

EXAMPLE 27

Hydrogen Peroxide Used:

22.4% concentration
200 milliliters
1.42 moles
Phosphine Used:
  0.706 moles at 0.0054 moles/minute
Amount of PHosphine Reacted with $H_2O_2$
  0.166 moles
Reaction Time: 2 hr. 00 min.
Temperature of Reaction: 23°–25° C.
pH of Aqueous Solution of $H_2O_2$: 3
  pH control with NaOH
Stirrer Rate: 1250 RPM
Conversion of $PH_3$: 23.5%
Selectivity: 100% hypophosphite
Ratio of $PH_3:H_2$ Used: 1:1.2

EXAMPLE 28

Hydrogen Peroxide Used:
  30.2% concentration
  200 milliliters
  1.97 moles
Phosphine Used:
  0.824 moles at 0.0069 moles/minute
Amount of Phosphine Reacted with $H_2O_2$
  0.188 moles
Reaction Time: 2 hr. 00 min.
Temperature of Reaction: 19°–25° C.
pH of Aqueous Solution of $H_2O_2$: 3
  pH control with NaOH
Stirrer Rate: 1250 RPM
Conversion of $PH_3$: 22.8%
Selectivity: 99% hypophosphite
Ratio of $PH_3:H_2$ Used: 1:1.2

EXAMPLE 29

Hydrogen Peroxide Used:
  22.4% concentration
  200 milliliters
  1.42 moles
Phosphine Used:
  0.662 moles at 0.0055 moles/minute
Amount of PHosphine Reacted with $H_2O_2$
  0.251 moles
Reaction Time: 2 hr. 00 min.
Temperature of Reaction: 39°–42° C.
pH of Aqueous Solution of $H_2O_2$: 3
  pH control with NaOH
Stirrer Rate: 1250 RPM
Conversion of $PH_3$: 37.9%
Selectivity: 90% hypophosphite
Ratio of $PH_3:H_2$ Used: 1:1.2

EXAMPLE 30

Hydrogen Peroxide Used:
  22.4% concentration
  200 milliliters
  1.42 moles
Phosphine Used:
  0.706 moles at 0.0056 moles/minute
Amount of Phosphine Reacted with $H_2O_2$
  0.165 moles
Reaction Time: 2 hr. 05 min.
Temperature of Reaction: 23°–26° C.
pH of Aqueous Solution of $H_2O_2$: 3
  pH control with NaOH
Stirrer Rate: 1250 RPM
Conversion of $PH_3$: 23.4%
Selectivity: 98% hypophosphite
Ratio of $PH_3:N_2$ Used: 1:1.2

EXAMPLE 31

Hydrogen Peroxide Used:
  22.4% concentration
  200 milliliters
  1.42 moles
Phosphine Used:
  0.662 moles at 0.0055 moles/minute
Amount of Phosphine Reacted with $H_2O_2$
  0.238 moles
Reaction Time: 2 hr. 00 min.
Temperature of Reaction: 23°–26° C.
pH of Aqueous Solution of $H_2O_2$: →1.
  No pH control
Stirrer Rate: 1250 RPM
Conversion of $PH_3$: 35.0%
Selectivity: 92% hypophosphorous acid
Ratio of $PH_3:H_2$ Used: 1:1.2

EXAMPLE 32

Hydrogen Peroxide Used:
  22.4% concentration
  200 milliliters
  1.42 moles
Phosphine Used:
  0.721 moles at 0.0058 moles/minute
Amount of Phosphine Reacted with $H_2O_2$
  0.201 moles
Reaction Time: 2 hr. 04 min.
Temperature of Reaction: 25° C.
pH of Aqueous Solution of $H_2O_2$: →1.
  No pH control
Stirrer Rate: 1250 RPM
Conversion of $PH_3$: 36.2%
Selectivity: 86% hypophosphorous acid
Ratio of $PH_3:H_2$ Used: 1:1.2

EXAMPLE 33

Hydrogen Peroxide Used:
  22.4% concentration
  200 milliliters
  1.42 moles
Phosphine Used:
  0.647 moles at 0.0053 moles/minute
Amount of Phosphine Reacted with $H_2O_2$
  0.263 moles
Reaction Time: 2 hr. 02 min.
Temperature of Reaction: 25° C.
pH of Aqueous Solution of $H_2O_2$: →1.
  No pH control
Stirrer Rate: 1250 RPM
Conversion of $PH_3$: 40.6%
Selectivity: 93% hypophosphorous acid
Ratio of $PH_3:H_2$ Used: 1:1.2

EXAMPLE 34

Hydrogen Peroxide Used:
  22.4% concentration
  200 milliliters
  1.42 moles
$H_3PO_2$ strating concentration: 15%
Amount of Phosphine Reacted with $H_2O_2$
  0.348 moles at 0.0029
Reaction Time: 2 hrs. 00 min.
Temperature of Reaction: 25° C.

pH of Aqueous Solution: 0.7 to 0.8
Stirrer Rate: 1250 RPM
Conversion of PH$_3$: 55%
Selectivity: Unknown (56–81%) Range
Ratio of PH$_3$:N$_2$ Used: 1:1.2

Although this invention has been described in terms of specific embodiments, it should be understood that these embodiments are by way of illustration only, and that this invention is not to be limited thereto since alternative embodiments and operating techniques will become apparent to those skilled in the art. Accordingly, modifications are contemplated which can be made without departing from the spirit of the invention.

What is claimed is:

1. A process comprising reacting, in the absence of a catalyst and under an acidic condition wherein said acidic condition is a pH of less than about 6, phosphine with an aqueous solution of hydrogen peroxide to produce an acid solution containing hypophosphorous acid (H$_3$PO$_2$) as the predominant phosphorus containing acid.

2. The process of claim 1 further comprising contacting the acid solution with an non-transition metal hydroxide oxide or carbonate to produce a product composition containing a metal hypophosphite.

3. The process of claim 1, wherein the acidic condition is a pH of less than about 3.

4. The process of claim 1, wherein the acidic condition is a pH of less than about 2.

5. The process of claim 1, wherein the acidic condition is a pH of less than about 1.

6. The process of claim 2, wherein the acidic condition is maintained at a substantially constant pH by contacting the acid solution with a a sufficient quantity of the non-transition metal hydroxide, oxide or carbonate to maintain such acidic condition.

7. The process of claim 6, wherein the non-transition metal hydroxide is sodium hydroxide.

8. The process of claim 1, wherein the aqueous solution of hydrogen peroxide contains from about 1% to about 35%, by weight, hydrogen peroxide.

9. The process of claim 1, wherein the molar ratio of hydrogen peroxide to phosphine is from about 0.75:1 to about 30:1.

10. The process of claim 1, wherein the mole ratio of hydrogen peroxide to phosphine is from about 0.75:1 to about 3:1.

11. The process of claim 1, wherein the reacting step takes place at a temperature of from about 20° C. to about 60° C.

12. The process of claim 1, wherein the reacting step takes place at a temperature from about 20° C. to about 45° C.

13. The process of claim 1, further comprising contacting the acid solution with calcium ions to precipitate out any phosphorous acid (H$_3$PO$_3$) and phosphoric acid (H$_3$PO$_4$) contained in the acid solution.

14. The process of any one of claims 1, 3–6, 8–12, and 13, further comprising contacting the acid solution with sodium hydroxide to produce a product composition containing sodium hypophosphite.

15. In a process for producing a non-transition metal hypophosphite of the type wherein phosphorus is reacted with an aqueous non-transition metal hydroxide composition to produce the hypophosphite and byproduct phosphine, the improvement comprising converting a substantial portion of the byproduct phosphine to hypophosphite by reacting, in the absence of a catalyst and under an acidic condition wherein said acidic condition is a pH of less than about 6, the phosphine with an aqueous solution of hydrogen peroxide to produce an acid solution containing hypophosphorous acid (H$_3$PO$_2$) as the predominant phosphorus containing acid and then contacting the acid solution with a non-transition metal hydroxide, oxide or carbonate to produce a product composition containing the hypophosphite.

16. The process of claim 15, wherein the phosphorus is yellow phosphorous (P$_4$) and the aqueous non-transition metal hydroxide composition is an aqueous suspension of sodium hydroxide and calcium hydroxide.

17. The process of claim 15, wherein the acidic conditions are a pH of less than about 3.

18. The process of claim 15, wherein the acidic conditions are a pH less than about 2.

19. The process of claim 15, wherein the acidic conditions are a pH of less than about 1.

20. The process of claim 15, wherein the acidic condition is maintained at a substantially constant pH by contacting the acid solution with a sufficient quantity of the non-transition metal hydroxide, oxide or carbonate to maintain such acidic condition.

21. The process of claim 15, wherein the aqueous solution of hydrogen peroxide contains from about 1% to about 35%, by weight, hydrogen peroxide.

22. The process of claim 15, wherein the molar ratio of hydrogen peroxide to phosphine is from about 0.75:1 to about 30:1.

23. The process of claim 15, wherein the molar ratio of hydrogen peroxide to phosphine is from about 0.75:1 to about 3:1.

24. The process of claim 15, wherein the reacting step takes place at a temperature of from about 20° C. to about 60° C.

25. The process of claim 15, wherein the reacting step takes place at a temperature from about 20° C. to about 45° C.

26. The process of claim 15, further comprising contacting the acid solution with calcium ions to precipitate out any phosphorous acid (H$_3$PO$_3$) and phosphoric acid (H$_3$PO$_4$) contained in the acid solution.

27. The process of claim 26, wherein the calcium ions are produced by calcium hydroxide, calcium oxide or calcium carbonate.

28. The process of any one of claims 16, 20–25, 26 and 27, wherein the non-transition metal hydroxide contacted with the acid solution is sodium hydroxide and the hypophosphite is sodium hypophosphite.

* * * * *

UNITED STATES PATENT AND TRADEMARK OFFICE
CERTIFICATE OF CORRECTION

PATENT NO. : 4,374,816
DATED : February 22, 1983
INVENTOR(S) : Gregory G. Arzoumanidis et al.

It is certified that error appears in the above—identified patent and that said Letters Patent is hereby corrected as shown below:

Col. 2, line 12, "160755s" should be -- 160744s --;

Col. 8, Table B, line 13, the temperature value next to 83 min. should read -- 25.5 -- rather than "22.5"; and Col. 11, line 20, "Ratio of $PH_3:N_3$" should read -- Ratio of $PH_3:N_2$ --.

Signed and Sealed this

Twenty-first Day of June 1983

[SEAL]

Attest:

DONALD J. QUIGG

Attesting Officer

Acting Commissioner of Patents and Trademarks